US010705011B2

(12) United States Patent
Lu et al.

(10) Patent No.: US 10,705,011 B2
(45) Date of Patent: Jul. 7, 2020

(54) DYNAMIC FOCUS SYSTEM AND METHODS

(71) Applicant: Iris International, Inc., Chatsworth, CA (US)

(72) Inventors: Jiuliu Lu, Miami, FL (US); Bian Qian, Weston, FL (US); Bart J. Wanders, Trabuco Canyon, CA (US); Ken Good, Glendale, CA (US); John Riley, Miami, FL (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 16/336,623

(22) PCT Filed: Oct. 5, 2017

(86) PCT No.: PCT/US2017/055245
§ 371 (c)(1),
(2) Date: Mar. 26, 2019

(87) PCT Pub. No.: WO2018/067770
PCT Pub. Date: Apr. 12, 2018

(65) Prior Publication Data
US 2019/0369000 A1 Dec. 5, 2019

Related U.S. Application Data

(60) Provisional application No. 62/405,162, filed on Oct. 6, 2016.

(51) Int. Cl.
*G01N 15/14* (2006.01)
*G06T 7/62* (2017.01)
(Continued)

(52) U.S. Cl.
CPC ........ *G01N 15/147* (2013.01); *G06T 7/0012* (2013.01); *G06T 7/62* (2017.01);
(Continued)

(58) Field of Classification Search
CPC ......... G01N 15/147; G01N 2015/1006; G01N 2015/1452; G06T 7/62; G06T 7/0012;
(Continued)

(56) References Cited

U.S. PATENT DOCUMENTS

2003/0209438 A1* 11/2003 Bressler .................... B03C 1/32
204/547
2013/0107043 A1* 5/2013 Fletcher ................ B04B 5/0442
348/143

FOREIGN PATENT DOCUMENTS

| EP | 2 439 511 A1 | 4/2012 |
| WO | 2014/146062 A2 | 9/2014 |
| WO | 2018/06770 A1 | 4/2018 |

OTHER PUBLICATIONS

PCT/US2017/055245 received an International Search Report and Written Opinion dated Jan. 23, 2018, all pages.

* cited by examiner

*Primary Examiner* — Jared Walker
(74) *Attorney, Agent, or Firm* — Schwegman Lundberg & Woessner, P.A.

(57) ABSTRACT

A method for dynamic focusing is presented that can be performed by a dynamic focusing controller that can receive images from the image capture device, and for each image, determine a border of the particle within the image, and calculate a pixel intensity ratio of the image based on the border of the particle. The dynamic focusing controller can also calculate a median pixel intensity ratio from the pixel intensity ratios for each image, determine a focal distance direction based on the median pixel intensity ratio, calculate a focal distance based on the median pixel intensity ratio when the focal distance direction is positive, and calculate the focal distance based on a median border width when the focal distance direction is negative. The autofocusing con- (Continued)

troller can then send an instruction to the focusing mechanism to adjust the image capture device by the focal distance in the focal distance direction.

20 Claims, 16 Drawing Sheets

(51) Int. Cl.
    *G06T 7/00*           (2017.01)
    *G01N 15/10*         (2006.01)
    *H04N 5/232*         (2006.01)

(52) U.S. Cl.
    CPC . *H04N 5/23212* (2013.01); *G01N 2015/1006* (2013.01); *G01N 2015/1452* (2013.01); *G06T 2207/10148* (2013.01); *G06T 2207/30024* (2013.01)

(58) Field of Classification Search
    CPC ........... G06T 2207/10148; G06T 2207/30024; H04N 5/23212; G02B 21/244; G02B 27/36
    See application file for complete search history.

805

810

815

DYNAMIC FOCUS SYSTEM AND METHODS

CROSS-REFERENCE TO RELATED APPLICATIONS

This application is a U.S. national phase under 35 U.S.C. § 371 of PCT International Application Number PCT/US2017/055245, filed on Oct. 5, 2017, entitled "DYNAMIC FOCUS SYSTEM AND METHODS," which claims the benefit of and priority to U.S. Provisional Patent Application No. 62/405,162, filed on Oct. 6, 2016, entitled "DYNAMIC FOCUS SYSTEM AND METHODS," each of which is hereby incorporated by reference in its entirety for all purposes.

BACKGROUND

Imaging of cells and particles in a sample fluid stream can be used to identify the cells and particles and determine whether an individual is healthy or is suffering from illness or disease. To gather the necessary information from the images, the focusing of the image capture device must be precise. Currently available methods for focusing systems have either relied on manual focusing or utilized markers on side of the fluid stream to focus. Existing systems, however suffer from the inability to maintain focus and actually focus on the item being captured in the image. Therefore, improved methods and systems are needed.

DETAILED DESCRIPTION

Figure 1:
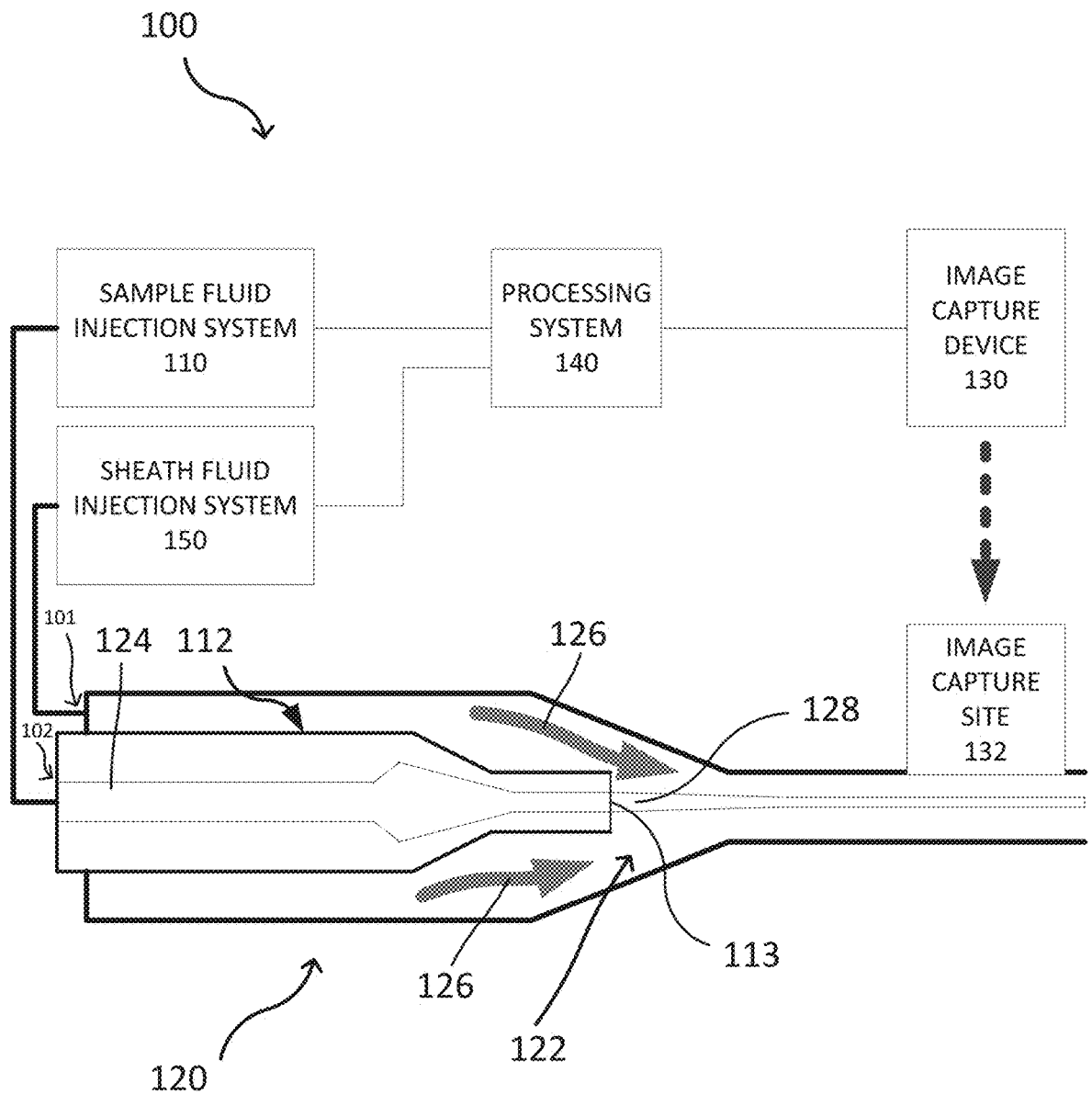
FIG. 1 illustrates aspects of an analyzer system according to embodiments of the present invention.

Analysis of a cell or particle from a living organism (e.g., humans, animals, and plants) can be used as a medical diagnostic tool used to identify diseases and cell defects as well as healthy cells. Capturing the cells or particles for analysis can be done by collection of particles through, for example, fluids from the living organism (i.e., a biological sample). For example, a blood sample from a person contains cells that can be analyzed to determine if the cells are healthy or have some problem that can be diagnosed.

Blood cell analysis is one of the most commonly performed medical tests for providing an overview of a patient's health status. A blood sample can be drawn from a patient's body and stored in a test tube containing an anticoagulant to prevent clotting. A whole blood sample normally comprises three major classes of blood cells including red blood cells (i.e., erythrocytes), white blood cells (i.e., leukocytes) and platelets (i.e., thrombocytes). Each class can be further divided into subclasses of members. For example, five major types or subclasses of white blood cells have different shapes and functions. White blood cells may include neutrophils, lymphocytes, monocytes, eosinophils, and basophils. There are also subclasses of the red blood cell types. The appearances of particles in a sample may differ according to pathological conditions, cell maturity and other causes. Red blood cell subclasses may include reticulocytes and nucleated red blood cells.

Unless expressly indicated otherwise, references to "particle" or "particles" made in this disclosure will be understood to encompass any discrete or formed object dispersed in a fluid. As used herein, "particle" can include all measurable and detectable (e.g., by image and/or other measurable parameters) components in biological fluids. The particles are of any material, any shape, and any size. Particles can comprise cells. Examples of particles include but are not limited to cells, including blood cells, fetal cells, epithelials, stem cells, tumor cells, or bacteria, parasites, or fragments of any of the foregoing or other fragments in a biological fluid. Blood cells may be any blood cell, including any normal or abnormal, mature or immature cells which potentially exist in a biological fluid, for example, red blood cells ("RBCs"), white blood cells ("WBCs"), platelets ("PLTs") and other cells. The members also include immature or abnormal cells. Immature WBCs may include metamyelocytes, myelocytes, pro-myelocytes, and blasts. In addition to mature RBCs, members of RBCs may include nucleated RBCs ("NTRCs") and reticulocytes. PLTs may include "giant" PLTs and PLT clumps. Throughout the specification, the images are described as being an image of a cell or a particle. Though referred to as a cell or RBC in many cases, the images can be of any particle. Platelets, reticulocytes, nucleated RBCs, and WBCs, including neutrophils, lymphocytes, monocytes, eosinophils, basophils, and immature WBCs including blasts, promyelocytes, myelocytes, or metamyelocytes are counted and analyzed as particles.

Exemplary urine particles can include urine sediment particles. Exemplary urine sediment particles can include erythrocytes (i.e., RBCs), dysmorphic erythrocytes, leukocytes (i.e., WBCs), neutrophils, lymphocytes, phagocytic cells, eosinophils, basophils, squamous epithelial cells, transitional epithelial cells, decoy cells, renal tubular epithelial cells, casts, crystals, bacteria, yeast, parasites, oval fat bodies, fat droplets, spermatozoa, mucus, trichomonas, cell clumps, and cell fragments. Exemplary cells can include red blood cells, white blood cells, and epithelials. Exemplary casts can include acellular pigment casts, unclassified cast (e.g., granular casts). Exemplary acellular casts can include, for example, waxy casts, broad casts, fatty casts, and crystal casts. Exemplary cellular casts can include, for example, RBC casts, WBC casts, and cellular casts. Exemplary crystals can include, for example, calcium oxalate, triple phosphate, calcium phosphate, uric acid, calcium carbonate, leucine, cystine, tyrosine, and amorphous crystals. Exemplary non-squamous epithelial cells can include, for example, renal epithelials and transitional epithelials. Exemplary yeast can include, for example, budding yeast and yeast with pseudohyphae. Exemplary urinary sediment particle can also include RBC clumps, fat, oval fat bodies, and trichomonas.

Blood cell analysis, for example, can be done using counting techniques. In counting techniques based on imaging, pixel data images of a prepared sample that may be passing through a viewing area are captured using a microscopy objective lens coupled to a digital camera. The pixel image data can be analyzed using data processing techniques, and also displayed on a monitor.

The term high optical resolution imaging device can include devices that are capable of obtaining particles images with sufficient visual distinctions to differentiate morphological features and/or changes. Exemplary high optical resolution imaging devices can include devices with an optical resolution of 1 µm or lower, including for example, 0.4 to 0.5 µm, such as for example, 0.46 µm.

In some embodiments, the images obtained in any of the compositions and/or methods of this invention may be digitized images. Optionally, at least part of the procedure for obtaining the images is automated. In some embodiments, the images may be obtained using a visual analyzer comprising a flowcell, a high optical resolution imaging device or the digital image capture device.

Optionally, the images provide information relating to the cytosolic, cell nucleus and/or nuclear components of the cell. Optionally, the images provide information relating to the granular component and/or other morphological features of the cell. Optionally, the images provide information relating to cytosolic, nuclear and/or granular components of the cell. The granular and/or nuclear images and/or features are determinative for cell categorization and subcategorization both independently or in combination with each other.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. Optionally, the systems may be configured as a distributed system where one or more components of the system are distributed across one or more networks in a cloud computing system. All features of the described systems are applicable to the described methods mutatis mutandis, and vice versa.

FIG. 1 depicts aspects of a system 100 for imaging particles in a fluid sample. The fluid sample can be a bodily fluid sample such as a blood fluid sample or a urine sample. As shown here, system 100 includes a sample fluid injection system 110, a flowcell 120, and image capture device 130, and a processing system 140. The flowcell 120 provides a flowpath 122 that transmits a flow of the sheath fluid, optionally in combination with the sample fluid. According to some embodiments, the sample fluid injection system 110 can include or be coupled with a cannula or tube 112. The sample fluid injection system 110 can be in fluid communication with the flowpath 122 (e.g., via sample fluid entrance 102), and can operate to inject sample fluid 124 through a distal exit port 113 of the cannula 112 and into a flowing sheath fluid 126 within the flowcell 120 so as to provide a sample fluid stream 128. For example, the processing system 140 may include or be in operative association with a storage medium having a computer application that, when executed by the processor, is configured to cause the sample fluid injection system 110 to inject sample fluid 124 into the flowing sheath fluid 126. As shown here, sheath fluid 126 can be introduced into the flowcell 120 by a sheath fluid injection system 150 (e.g., via sheath fluid entrance 101). For example, the processing system 140 may include or be in operative association with a storage medium having a computer application that, when executed by the processor, is configured to cause the sheath fluid injection system 150 to inject sheath fluid 126 into the flowcell 120.

The sample fluid stream 128 has a first thickness T1 adjacent the injection tube 112. The flowpath 122 of the flowcell 120 having a decrease in flowpath size such that the thickness of the sample fluid stream 128 decreases from the initial thickness T1 to a second thickness T2 adjacent an image capture site 132. The image capture device 130 is aligned with the image capture site 132 so as to image a plurality of the particles from the sample fluid at the image capture site 132 of the flowcell 120.

The processing system 140 is coupled with the sample fluid injector system 110, the image capture device 130, and optionally the sheath fluid injection system 150. The processing system 140 is configured to initiate capture of the images of the plurality of the particles from the sample fluid at the image capture site 132 of the flowcell 120. For example, the processing system 140 may include or be in operative association with a storage medium having a computer application that, when executed by the processor, is configured to cause the image capture device 130 to initiate capture of an image of a second plurality of the particles from the second sample fluid at the image capture site 132 of the flowcell 120 after the sample fluid transients and within four seconds of the imaging of the first plurality the particles.

The processing system 140 can further be a dynamic focusing controller. Processing system 140 can be, for example computer system 1600 of FIG. 16. The processing system 140 can receive and process the images as described in more detail herein. By processing the images, the processing system 140 can determine whether the image capture device 130 is in focus. If the image capture device 130 is not in focus, the processing system 140 can, for example, cause the image capture device 130 to adjust focus, create a report, or notify technicians by sending an alert. The processing system 140 can cause the image capture device 130 to adjust focus by, for example, sending an instruction to a focusing mechanism (not shown) of the image capture device 130 to adjust the focus.

Figure 2:
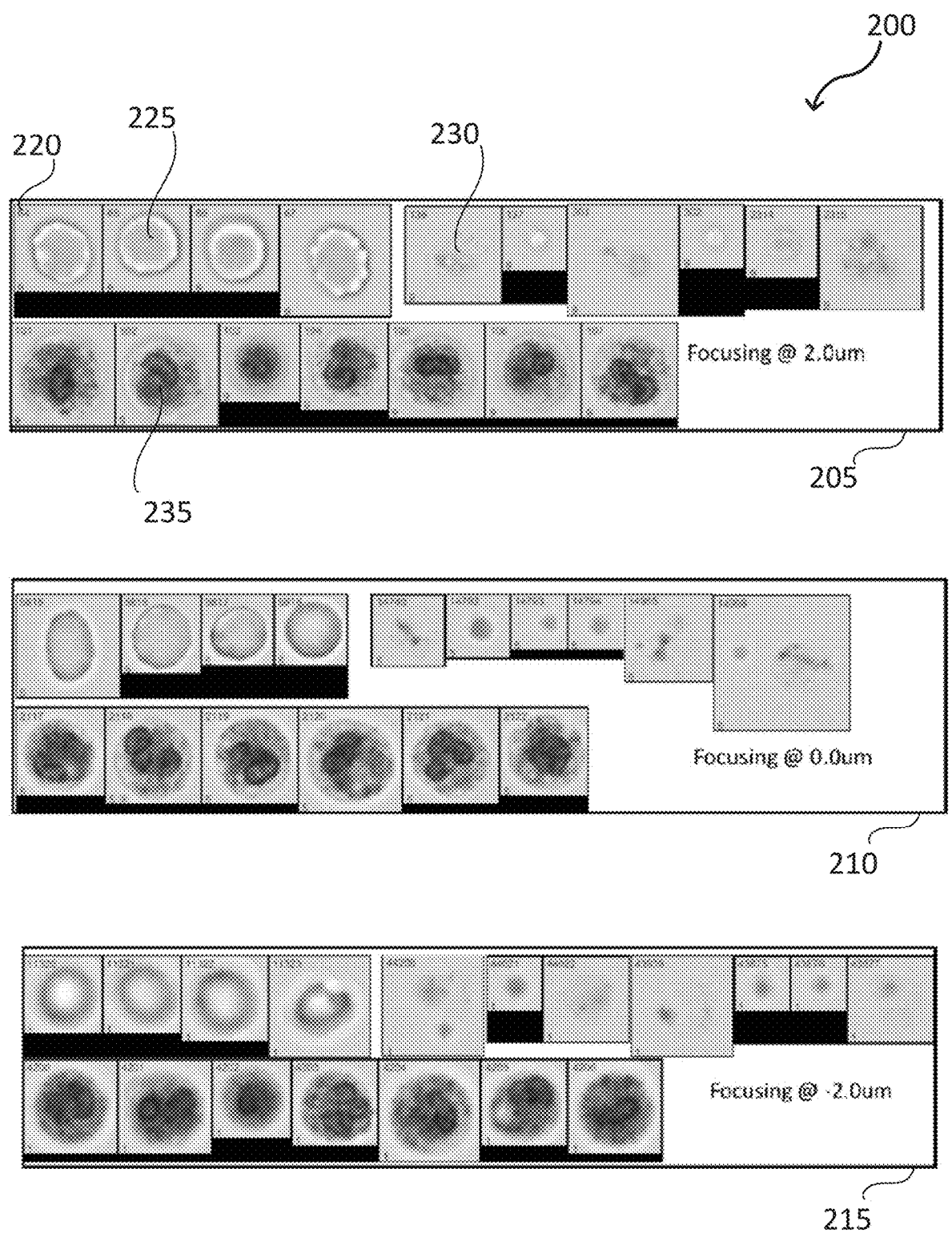
FIG. 2 depicts various blood cell types at multiple focusing distances.

FIG. 2 depicts a set of images 200 illustrating various blood cell types at multiple focusing distances. The set of images 200 includes, for example, an image of a RBC 225, a WBC 230, and a PLT 235. There are multiple images of each type of cell (e.g., RBC, WBC, and PLT).

For images to be in focus, the focal plane should be at the sample stream. If the focal plane is not at the sample stream, the images can be out of focus. If the focal plane is at a certain distance from the sample stream, the image is considered to be focused at a distance "d." Depending on which direction the focal plane is from the sample stream determines whether the focusing is positive or negative. The direction determined for positive and negative focusing is arbitrarily chosen and is only intended to imply that negative focusing is in the opposite direction of positive focusing.

The first subset of images 205 includes images of the different types of cells with a positive focusing of 2 μm. The second subset of images 210 includes images of the different types of cells with a neutral focusing of 0 μm (i.e., in focus). The third subset of images 215 includes images of the different types of cells with negative focusing of −2 μm.

Focusing of 2 μm or −2 μm indicates that the image focal plane was at a distance of 2 μm to the sample stream in either direction along the optical axis. As can be seen by the various images in FIG. 2, when the images are in focus, having a neutral focusing of 0 μm, the images are most clear. When the images have negative or positive focusing, the images are blurry and more difficult to see because they are out of focus.

The images depicted in FIG. 2 are at a known focusing distance and direction. However, in a practical application of an imaging system, after receiving the images captured by an image capture device, a processor (e.g., processing system 140) can automatically determine whether the focusing of the images is in or out of focus, in which direction, and the focal distance. The process to determine the focusing distance and direction is described in more detail below. Once the focal distance and direction are determined, the processor can send an instruction to the focusing mechanism of the image capture device to automatically adjust the focus, generate a report, and/or send an alert to, for example, a technician providing focusing information for the image capture device.

Figure 3:
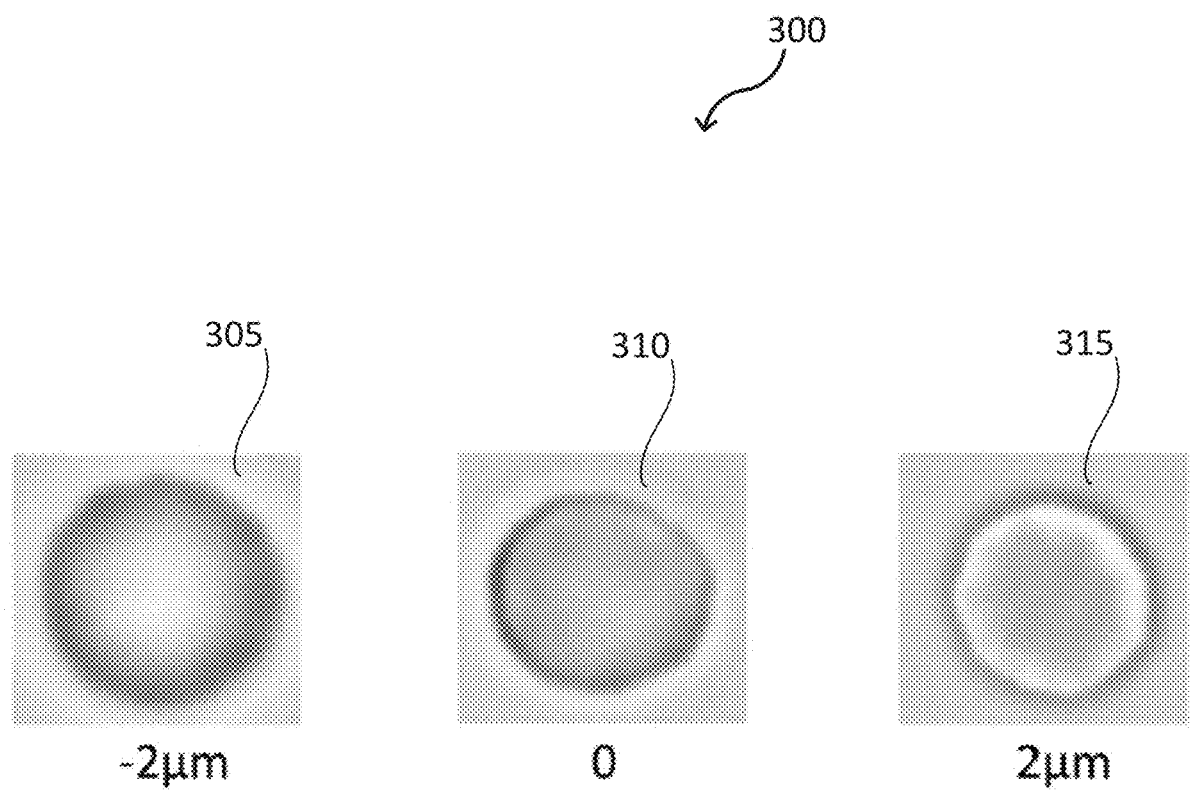
FIG. 3 depicts an image of a red blood cell at negative, neutral, and positive focusing distances.

FIG. 3 illustrates a set of images 300. The set of images 300 are each microscopic images of normal RBCs. RBC image 305 is captured with the image capture device focusing at a distance of −2 μm to the expected sample stream. RBC image 310 is captured with the image capture device focusing at a distance of 0 μm to the expected sample stream. RBC 315 is captured with the image capture device focusing at a distance of 2 μm to the expected sample stream. A typical human RBC is a biconcave disk, 0.8-1 μm thick in the disk center and 2-2.5 μm thick in the rim. Due to its uneven thickness and its high refractive index relative to the refractive index of the surrounding fluid, light rays when traveling through the cell deviate from the original propagation direction. Depending on whether lights travel through the center (acting like a concave lens) or the rim (acting like a convex lens), the light rays could be diverged or converged. The light convergence/divergence in different parts of the RBC results in a virtually asymmetric distribution of light sources along the optical axis about the center plane of the cell disk. Therefore, a RBC, when viewed on the image plane, displays varying intensity profiles as the imaging system focuses at changing positions as shown in FIG. 3. At negative focusing positions, the center part of the cell disk looks much brighter than the rim (i.e., the outer border). In contrast, at positive focusing positions, the center part of the cell in the image becomes darker than the rim. Once the RBC is right in focus, the brightness contrast between the center part and the rim is reduced. From this observation, the brightness contrast between the cell center and its rim can be used as an indicator of the focusing position. For that reason, RBCs can be used for the dynamic focusing described herein with very good results. Although RBCs are described throughout the present disclosure, the techniques described herein can be used on other particles including but not limited to other blood cells, bacteria, crystals, and the like.

Because of the behavior of the light from the refractive portions of a RBC, a pixel intensity ratio ("PIR") can be defined according to the mean pixel intensity value in the rim of the cell divided by the mean pixel intensity value in the center part of the cell:

$$PIR = \frac{I_{rim}}{I_{center}}$$

The division between the center part and the rim of the RBC can be determined based on a distance plot. The distance plot can show the relationship of an average V value, the V value being the V in the Hue Saturation Value ("HSV") color space, with respect to the distance to the RBC border (i.e., boundary). The distance plot constructed from the V value is called a V-distance plot. Optionally, other image properties, for example pixel intensity, can be used to construct the distance plot.

Figure 4:
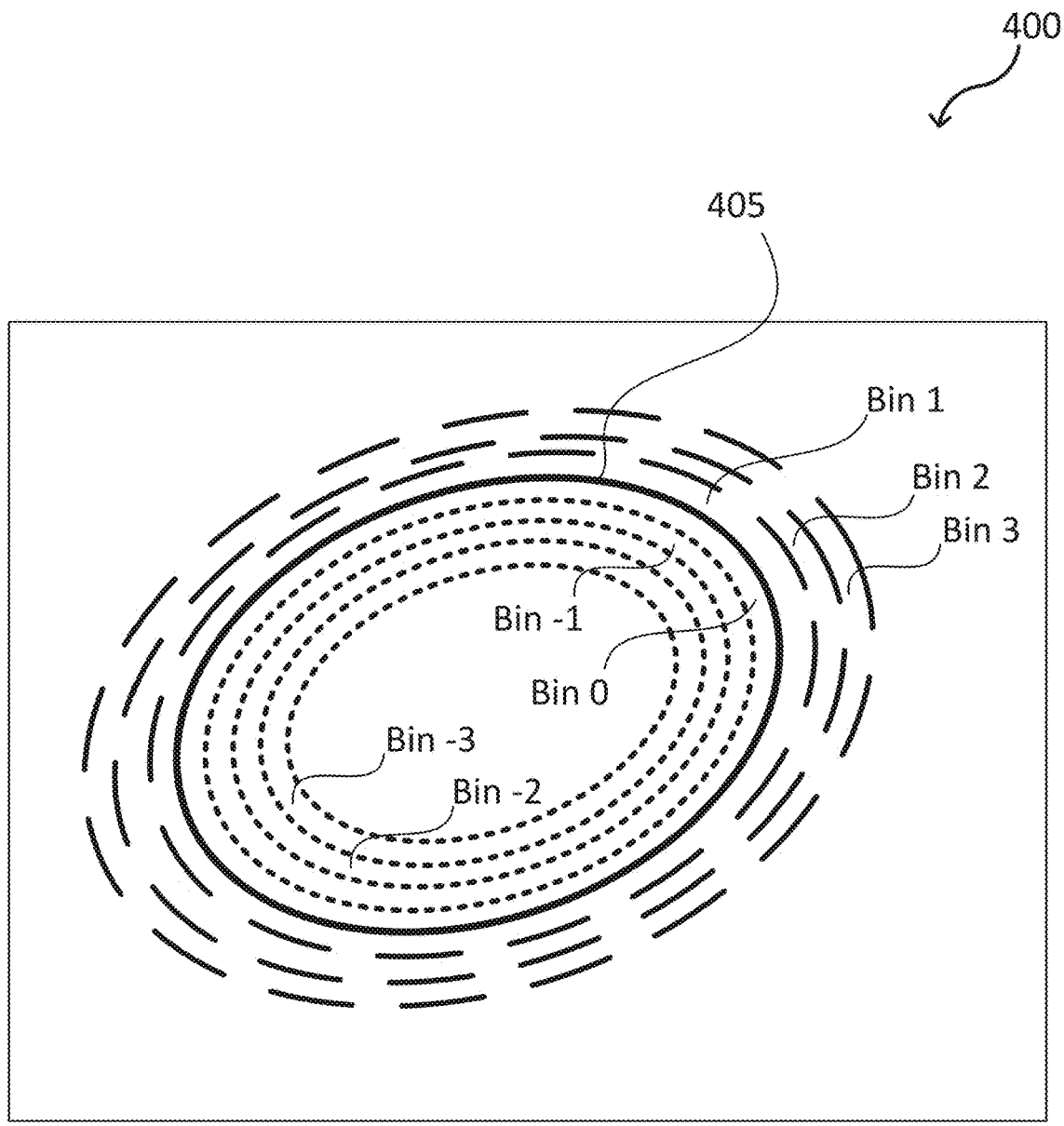
FIG. 4 illustrates an example border and corresponding rings for generating a V-distance plot of a red blood cell.

FIG. 4 illustrates an example border and corresponding rings for generating a V-distance plot of a RBC. To generate a V-distance plot, the cell boundary (i.e., border) must first be found. The border can be found using image segmentation methods. For example, a threshold value can be used for identifying the border of the RBC. RGB or V values of 204, for example, can be used with good results.

To find the cell border, each pixel from the image can be analyzed and the V value of the pixel can be compared with the threshold value (e.g., 204). If the V value of the pixel is less than the threshold value, the pixel can be labelled a background pixel. If the V value of the pixel is greater than or equal to the threshold value, the pixel can be labelled a foreground (i.e., cell or particle) pixel. Once each of the pixels are labelled, the pixels can each be analyzed to determine if the neighboring pixels are background or foreground pixels. Each pixel has 4 neighboring pixels—one to the right, one to the left, one above, and one below. To account for stray inaccuracies, if each of the neighboring pixels is a background pixel, the pixel can be labelled a background pixel. Similarly, if each of the neighboring pixels is a foreground pixel, the pixel can be labelled a foreground pixel. To identify the border pixels, if one or more neighboring pixels is a background pixel and one or more pixels is a foreground pixel, the pixel is labelled a border pixel.

Once the border pixels have all been identified, the rings shown in FIG. 4 can be calculated to identify the corresponding bins (e.g., bin 0, bin 1, bin 2, bin 3, bin −1, bin −2, and bin −3). The border pixels should generate a ring, being the border or boundary ring of the cell, shown as the solid border line 405. Bin 0 is identified by moving inward 1 pixel from the border pixels to get the next inner ring. Bin 0 is the area between the border ring and the ring 1 pixel inward from the border. Bin −1 is the area between the ring 1 pixel inward from the border and the ring 2 pixels inward from the border. The process continues inward by an additional pixel to identify bins −2 and −3. Similarly, bin 1 is identified by moving outward 1 pixel from the border ring to get the ring 1 pixel outward from the border. Bin 1 is the area between the border ring and the ring 1 pixel outward from the border ring. The process can be continued outward by 1 pixel to identify bins 2 and 3. Another example of how to identify the bins is using image morphological erosion/dilution.

Once each bin is identified, an average V value can be calculated for each bin. The average V value for each bin can be calculated by identifying the V value for each pixel within the bin and calculating the average (e.g., the average V value of all the pixels between the boundary and the 1 pixel inward ring is the average V value at bin 0). The average V value for each bin can be plotted to generate a V-distance plot for the imaged RBC.

Figure 5:
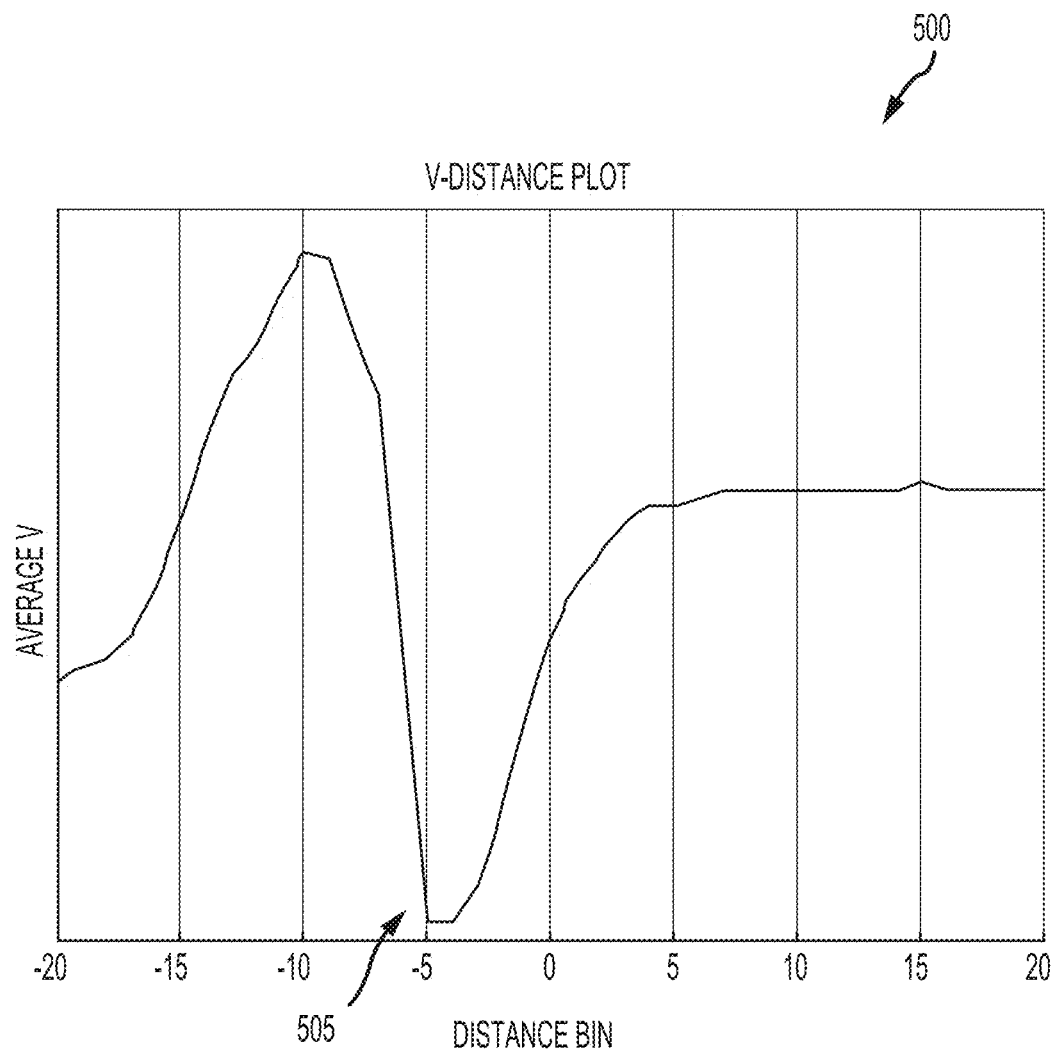
FIG. 5 illustrates a V-distance plot of a red blood cell.

FIG. 5 illustrates an example V-distance plot calculated using the above described method. For each bin, which is identified in the x-axis, the Average V value is plotted along the y-axis. A deep valley is seen at 505 on the V-distance plot no matter whether the RBC is imaged in focus or not. The deep valley 505 corresponds to the boundary region (i.e., border) of the RBC The deep valley corresponds with the boundary even in an out-of-focus image where the exact boundary is poorly defined. With the V-distance plot, the point midway between the left end and the valley bottom is designated the division between the center of the RBC and its rim.

Figure 6A:
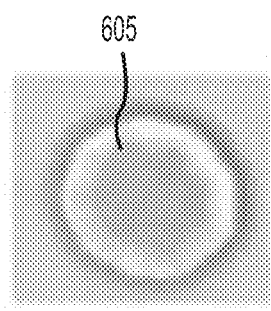
FIG. 6 illustrates another V-distance plot of a red blood cell.
Figure 6C:
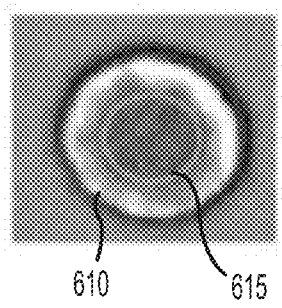
Figure 6B:
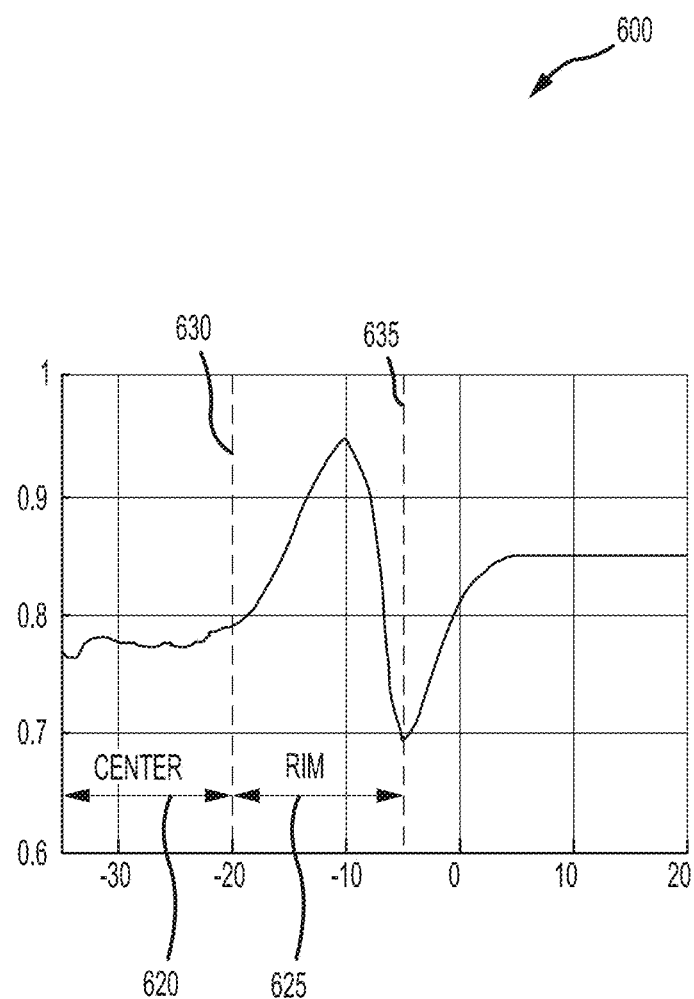

To more clearly illustrate the rim and center of the RBC in the V-distance plot, FIG. 6 depicts another V-distance plot 600 of a red blood cell 605. As can be seen at border line 635 of the V-distance plot, the valley corresponds with the border 610 of the RBC 605. The border 610 is shown as an overlay on the RBC. The midpoint line 630 on the V-distance plot indicates the separation between the center of the RBC and the rim. The center line 615 is shown overlaid on the RBC and corresponds to midpoint line 630. The distance between the left edge of the V-distance plot (i.e., center of the RBC) and the midpoint line 630 is the center distance 620 of the RBC. The distance between the midpoint line 630 and the border line 635 is the rim distance 625 of the RBC.

Figure 7:
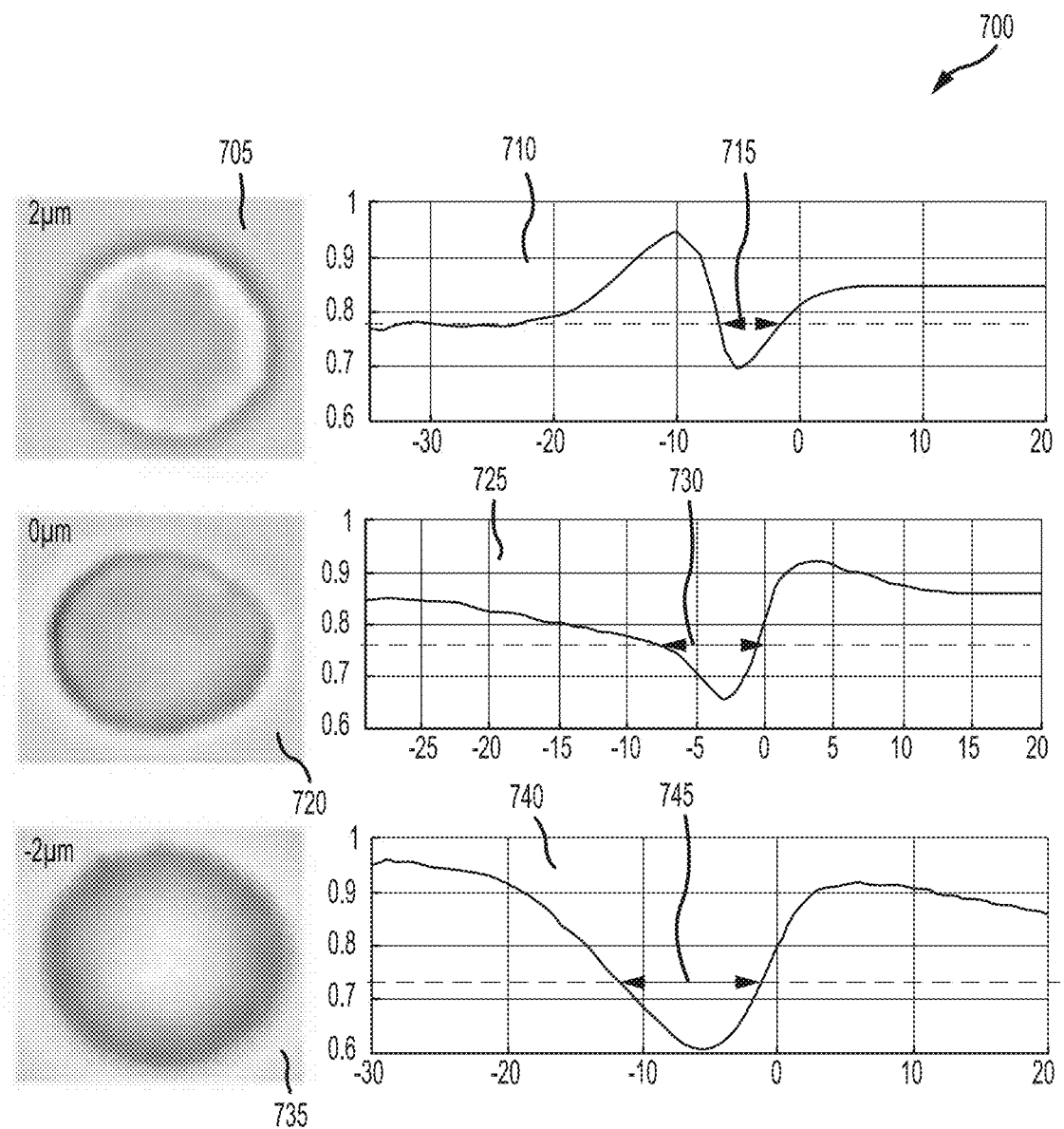
FIG. 7 illustrates example V-distance plots for red blood cells imaged at negative, neutral, and positive focusing distances.

FIG. 7 illustrates a set of V-distance plots 700 for varying focusing distances. For example, RBC 705 is at a focusing distance of 2 μm, and V-distance plot 710 was generated from RBC 705 using the ring method described above with respect to FIGS. 4 and 5. RBC 720 is at a focusing distance of 0 μm, and V-distance plot 725 was generated from RBC 720 using the ring method described above with respect to FIGS. 4 and 5. RBC 735 is at a focusing distance of −2 μm, and V-distance plot 740 was generated from RBC 740 using the ring method described above with respect to FIGS. 4 and 5.

As seen on the V-distance plots 710, 725, and 740, the valley varies in width at different focusing positions, which makes the valley width a candidate feature for focusing distance evaluation. Since the valley on the V-distance plot corresponds to the boundary region of the cell, the width of the valley can be considered as a measurement of the width of the cell boundary region ("BW"). For consistent measurement of BW across different cell images, the valley width is measured as the distance (in unit of pixels) between the first and the last data point whose value is lower than the average of the valley bottom and the image background. The image background is predefined based on the optical setup. As shown in FIG. 7, for negative focusing, the BW 715 is narrow as compared to the BW 730 when the image is in focus. Further, the BW 745 is wider for positive focusing as compared to the BW 730 when the image is in focus.

Figure 8:
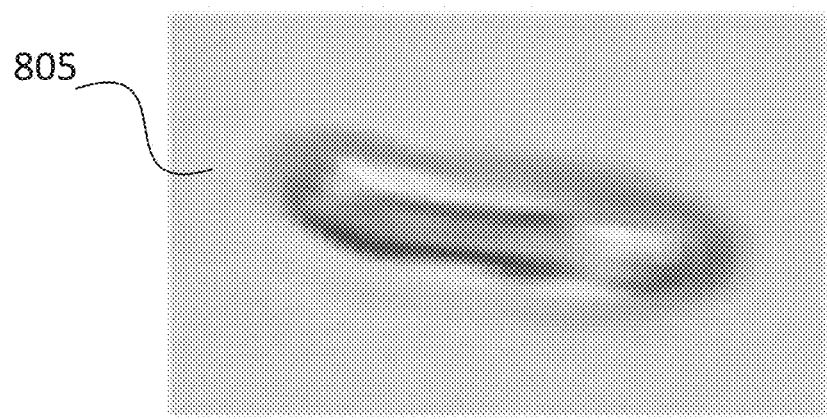
FIG. 8 illustrates example images of red blood cells that are not aligned with the focal plane of the image capture device or that have abnormal shapes.
Figure 8:
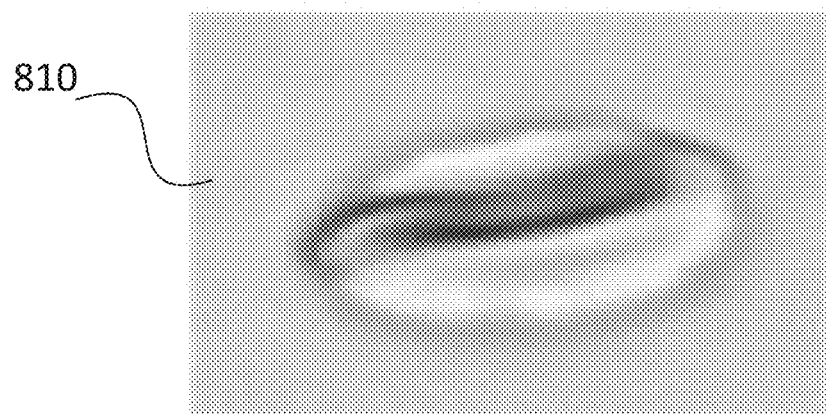
Figure 8:
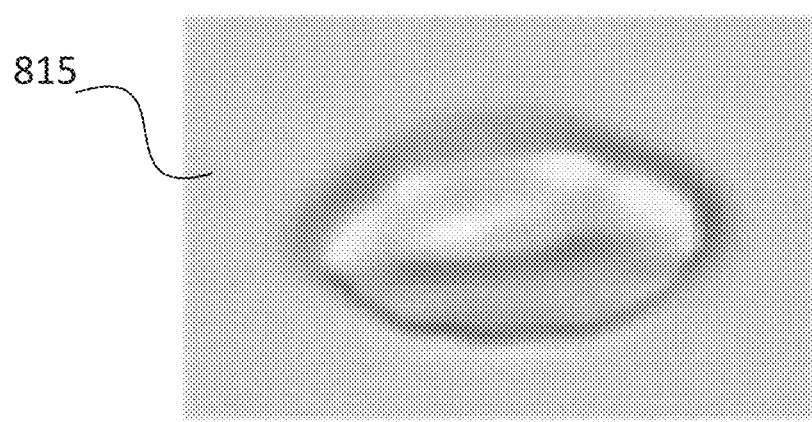

FIG. 8 illustrates example images of RBCs that are not aligned with the focal plane of the image capture device or that have abnormal shapes. The RBC depicted at 805, for example, appears sideways with respect to the focal plane. The RBC depicted at 810, for example, also appears turned with respect to the focal plane. The RBC depicted at 815, as another example, appears to be misshapen as compared to a typical RBC. The RBCs depicted at 805, 810, and 815 are not good candidates for identifying whether the images are in or out of focus. Therefore, images that depict RBCs that are not substantially round can be discarded from the calculations discussed herein.

To determine whether an image should be discarded, the cell width and height can be measured. The cell width can be found by determining, after finding the border of the cell, the longest axis. The height can then be determined by finding the distance perpendicular to the width of the cell at the center of the width. A ratio of the height and width can be calculated. If the ratio is close to 1, within a specified threshold, the image can be retained. If the ratio is much larger or much smaller than 1 (e.g., over a threshold value), the image can be discarded. For example, if the ratio is less than, for example, 0.7 or greater than, for example, 1.3, the image can be outside a threshold value of 0.3 and discarded from the analysis.

Optionally, another method for determining whether an image is good for use in analysis includes determining convexness of the cell depicted in the image. Convexness can be determined by measuring the area of the cell that is concave and the total area of the cell. Dividing the area of the cell that is concave by the total area of the cell provides a convexness ratio. If the ratio is large, the cell is concave. If the ratio is close to one (1), the cell is convex. If the cell is convex it can be determined to be a useful image for analysis.

Figure 9:
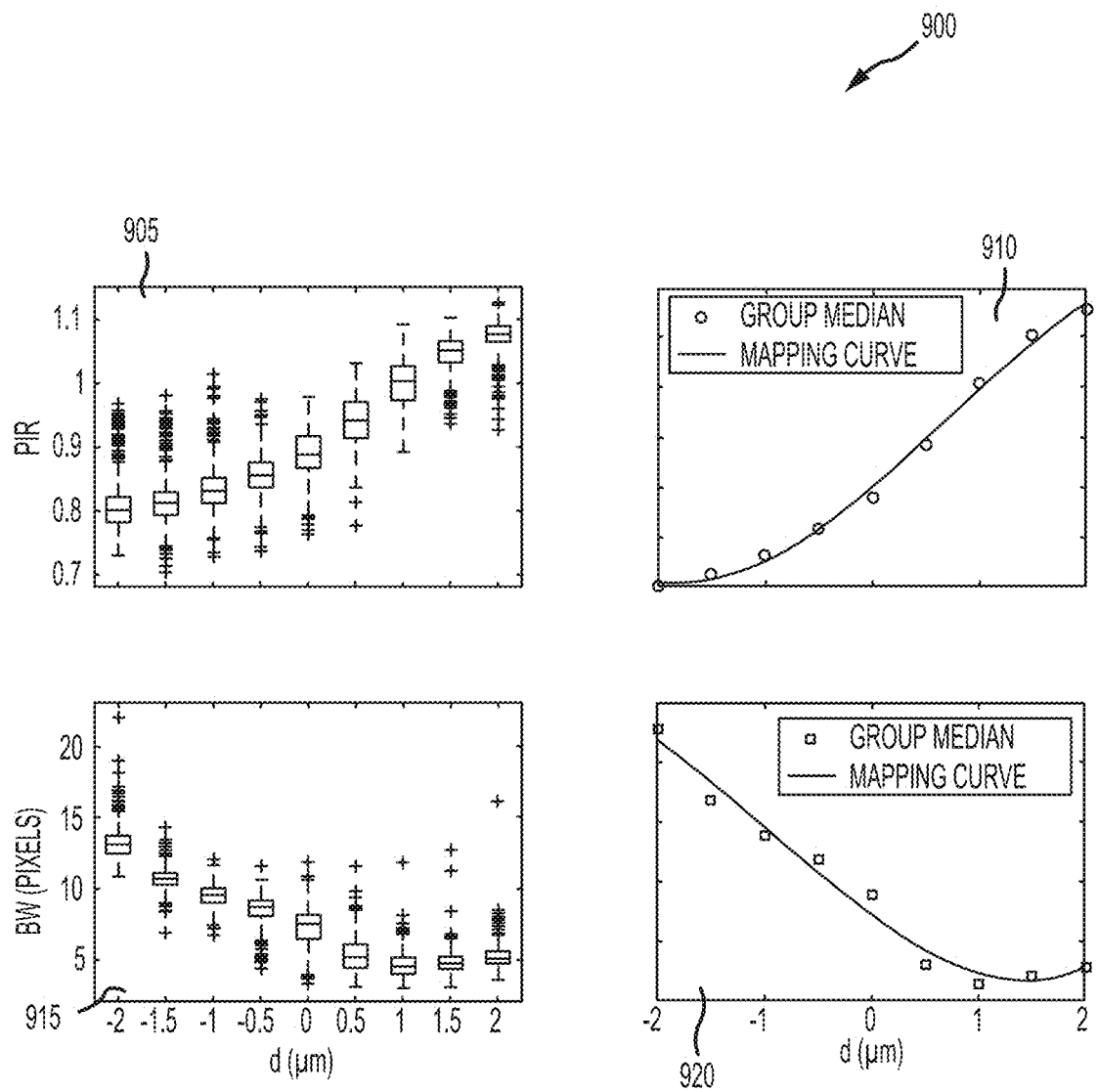
FIG. 9 illustrates example mapping curves for estimating focusing position.

FIG. 9 illustrates example mapping curves for estimating focusing position of the image capture device after taking multiple samples. Through this process the proof of concept was established and confirmed that the calculations provide a reliable way to identify and determine the focusing distance and direction of the image capture device with respect to the sample stream. Plot 905 is a box blot of the PIR values collected from different sample runs. Plot 915 is a box plot of the BW values collected from the different sample runs. Between consecutive runs, image focus was changed by a constant distance of 0.5 μm. For each sample run, about 1000 RBCs were imaged, processed to identify the border, and screened such that those images of cells that were misaligned with the focal plane or abnormally shaped were removed from the sample set. For each sample, about 600 qualified RBCs remained in the sample set. Plot 910 depicts the representative PIR values to the focusing position, which is approximated with a third order polynomial equation. Plot 920 depicts the representative BW values to the focusing position, which is also approximated with a third order polynomial.

In order to quantitatively estimate the focusing position from the feature values, PIR and BW, a mathematical model is needed to relate them to the focusing position. The focusing unit or mechanism can be programmed to displace the imaging focus along the optical axis and control the distances of the imaging focus to the sample stream. RBC images acquired at a certain focusing position d can then be analyzed to derive the associated PIR and BW values. At each focusing position, many digital frames can be acquired. Each digital frame contains one or multiple RBCs. Each individual RBC is processed and screened prior to feature measurement (i.e., measurement of PIR and BW), in order to exclude the cells imaged with abnormal shapes or tilting with respect to the focal plane (see FIG. 8). The feature values of PIR and BW were then evaluated for each qualified cell. For a typical blood sample, approximately 600 cells were retained in the sample set. The collected feature values (i.e., PIR and BW) display a probability distribution. The distribution changes with focusing position. By taking the median of the distribution as the representative feature value, a relation of the representative feature values to the focusing positions can be built. Many regression methods and/or their combination can be applied to model the relationship between the focusing positions and PIR and BW. A third order polynomial equation can be used as seen in plot 910 and plot 920 of FIG. 9 to illustrate the process. The derived model equations are:

$$BW(d)=0.18d^3+0.51d^2-2.63d+6.85$$

$$PIR(d)=-0.005d^3+0.011d^2+0.09d+0.9$$

The derived model equations reveal that at positive focusing positions, PIR is more sensitive to varying focusing position compared to the change of BW. At negative focusing positions the situation is reversed, and BW is more sensitive to the varying focusing position compared to the change of PIR. Therefore, to achieve better accuracy, a hybrid function using both PIR and BW for estimating focusing position is:

$$d(PIR, BW) = \begin{cases} PIR^{-1}(d), & \text{when } PIR^{-1}(d) \geq 0 \\ BW^{-1}(d), & \text{otherwise} \end{cases}$$

Here $PIR^{-1}(d)$ and $BW^{-1}(d)$ denote the inverse function of PIR (d) and BW (d) respectively. The above expression states that the focusing position d is estimated with PIR when the estimated focusing position is nonnegative. Otherwise the focusing position d is estimated from BW. The above model equations are an example of one way to determine the focusing position using PIR and BW. Other equations can be used and still remain within the scope of this disclosure.

Figure 10:
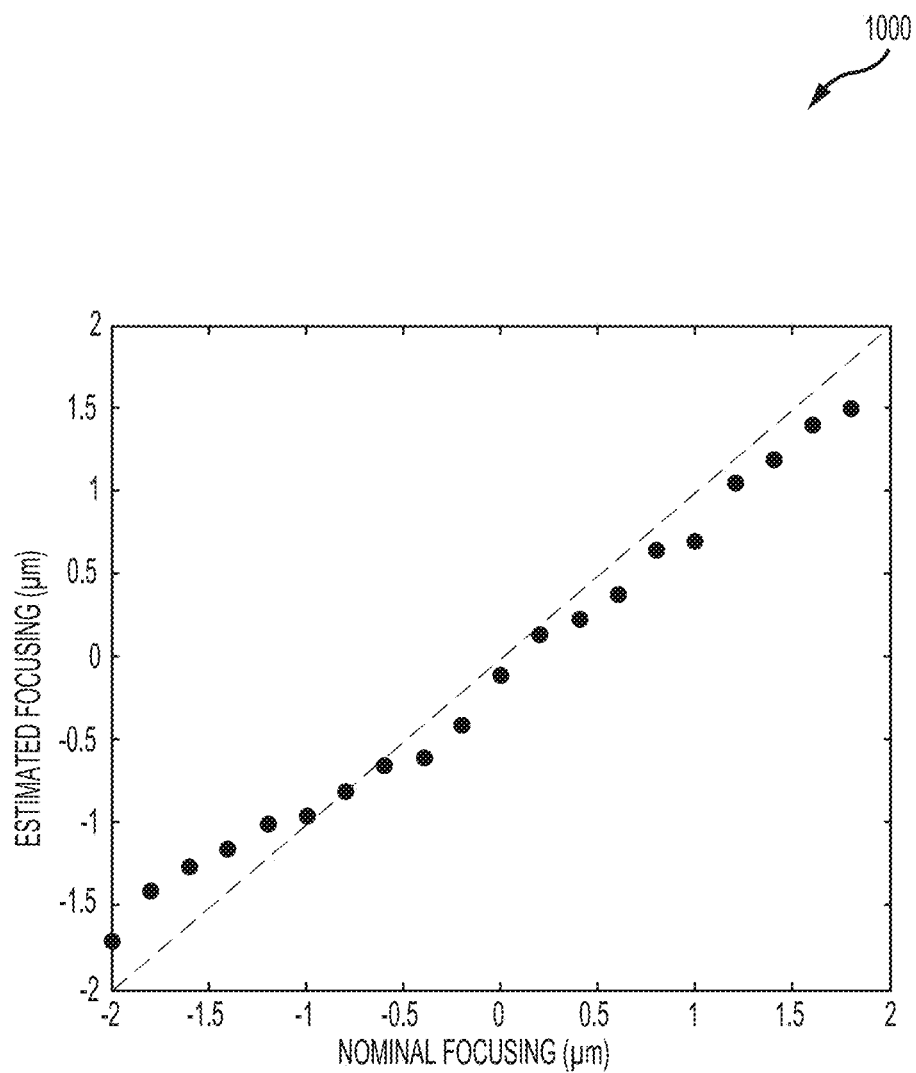
FIG. 10 depicts a comparison of evaluated focusing positions with an ideal focusing position.

As a proof that such analysis is accurate, FIG. 10 depicts a comparison of evaluated focusing positions with an ideal focusing position. In order to evaluate the effectiveness of the derived mapping function d(PIR,BW), focusing positions were estimated for a set of cell images which were taken separately. The image set consists of 20 blood sample runs. Between the consecutive sample runs, the focusing position was displaced by a fixed step distance 0.2 μm. At each focusing position, hundreds of cells were imaged and analyzed to measure the feature values of PIR and BW. From the measured feature values, PIR and BW, focusing positions were computed with the mapping function, d(PIR, BW), and were compared with the focusing positions set by the focusing unit. FIG. 10 depicts the comparison. It is seen from FIG. 10 that d(PIR, BW) is very close to the true focusing position d, especially within the range of −1 μm and 2 μm.

The derived calculations and methods, and specifically the use of PIR and BW, can be used, therefore, to dynamically focus an image capture device using a processor, such as image capture device 130 and processing system 140 of FIG. 1. The methods are described in more detail below.

Figure 11:
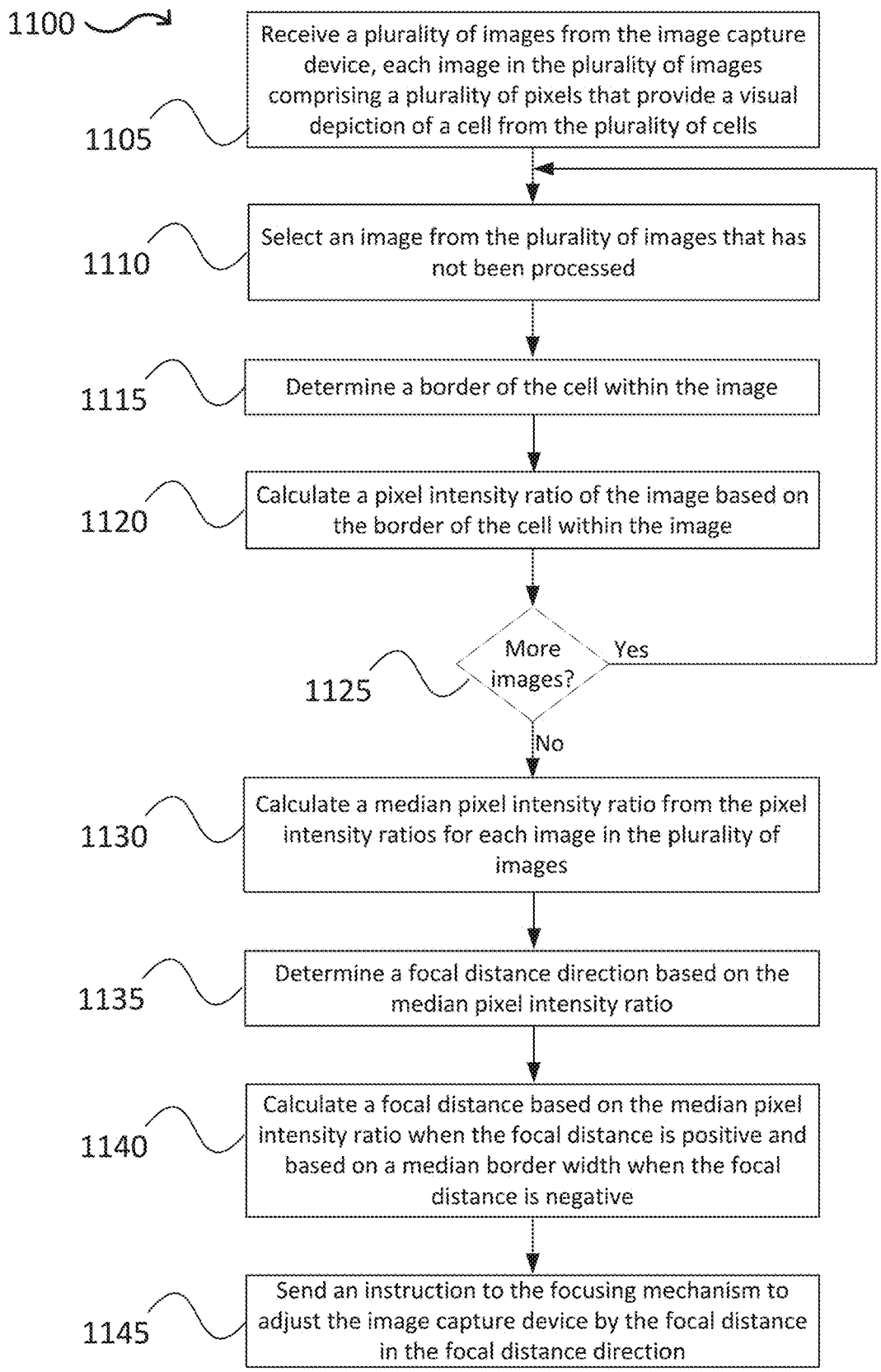
FIG. 11 illustrates a flow diagram of a method for performing dynamic focusing according to an embodiment.

FIG. 11 illustrates a flow diagram of a method 1100 for performing dynamic focusing. The method 1100 can be performed by a controller, such as a dynamic focusing controller, which can be a computer system, such as processing system 140 of FIG. 1 or computer system 1600 of FIG. 16. The method 1100 can begin at 1105 with receiving a plurality of images from an image capture device, such as image capture device 130 of FIG. 1. Each image in the plurality of images can have a plurality of pixels that provide a visual depiction of a cell from the plurality of cells. The images can be received after, for example, a sample stream is imaged. The sample stream can be imaged as a pre-run to calibrate the image capture device prior to running samples for cell analysis of a patient. Optionally, the sample stream can be imaged during the course of running and analyzing samples for cell analysis of a patient, which can be also utilized for dynamic focusing during the practical use of the image capture device. Optionally, the sample stream can be imaged as quality control at any time to ensure the image capture device has not become out of focus. Optionally, the controller can be in a state configured to run the sample as a patient sample or a control sample.

Each of the images can be processed for determining the focal distance and direction of the focal distance. The processing can begin at 1110 by selecting an image from the images that has not been processed. All images from the sample stream can be analyzed in order to not rely on a single image for determination of focusing distance and direction. Optionally, any number of images can be analyzed to determine focusing including only one (1) or as many as thousands.

At 1115, the cell border can be identified by the processor for the selected image. As described above, the border can be identified by evaluating the pixels of the image and determining the V value for each pixel. Once the V value for each pixel is determined, the pixel can be labelled as a background, foreground, or border pixel.

At 1120, the PIR of the image can be calculated by the processor based on the border of the cell. As described above, the PIR of the image can be determined by dividing the pixel intensity value of the rim of the cell by the pixel intensity value of the center of the cell.

At 1125, the processor can determine whether there are more images to process. If more images remain for processing, the next image can be selected and processed to determine the PIR of each image. Once every image has been processed to calculate the PIR of the images, the method 1100 can continue on to calculate a median pixel intensity ratio based on the PIR of each of the images at 1130.

At 1135, the processor can determine the focal distance direction based on the median PIR. Using the median PIR, the value for the focal distance can be calculated with the calculationPIR (d). If d is negative, the focal distance direction is negative, and if d is positive, the focal distance direction is positive.

At 1140, if the focal distance direction is positive, d as calculated from the PIR(d) equation is the focal distance. If the focal distance direction is negative, the processor can calculate d from the BW (d) equation discussed above.

At 1145, the processor can send an instruction to a focusing mechanism to adjust the image capture device by the focal distance in the focal distance direction, thereby dynamically focusing the image capture device. Optionally, the processor can generate a report providing the focusing information. As another option, the processor can send an alert to a technician or other user of the image capture device with the image capture device focusing information. The dynamic adjusting, report, and alert can be done in any combination or only one (1). For example, in some cases, only an alert can be sent providing information of the focusing information. The alert can be, for example, a text message (e.g., SMS message) or an email. The alert can be sent to any technician or other user that would have use for the focusing information including, for example, a technician, a user, or a manager.

In some cases, a threshold value can be set such that exceeding the threshold indicates that the image capture device is too far out of focus to produce reliable results of the sample stream. Optionally, if the focal distance exceeds the threshold value indicating that the image capture device is too far out of focus, the sample stream can fail. Optionally, if the state of the controller is patient sample (i.e., the system is running a patient sample), the controller can inhibit the results of the patient sample. Optionally, if the state of the controller is control sample (i.e., the system is running a control sample), the controller can fail the results. Upon failing the results of either a patient sample or a control sample, the controller can send a notification to a technician or other user or can generate a failure report. Optionally, the notification and/or failure report can be logged.

Figure 12:
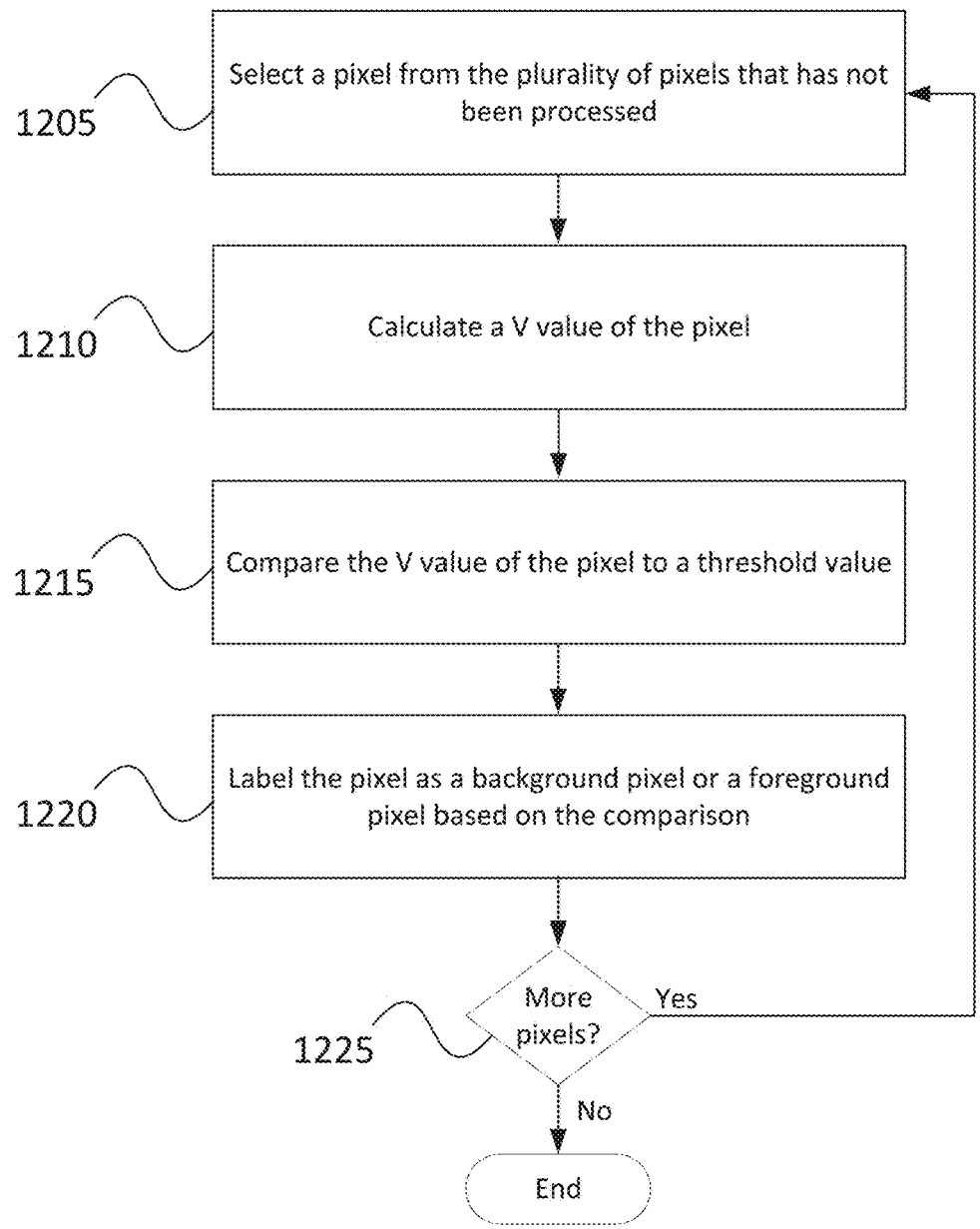
FIG. 12 illustrates another flow diagram of a method for performing dynamic focusing according to an embodiment.

FIG. 12 illustrates a flow diagram of a method 1200 for identifying the cell border of an image. Method 1200 can be performed by a computer system, for example processing system 140 of FIG. 1 or computing system 1600 of FIG. 16. The method 1200 can be used to provide more detail of 1115 of FIG. 11. Each of the pixels of the image can be processed, so at 1205 a pixel that has not been processed can be selected.

At 1210, a V value of the pixel can be determined. The V value can be the value from the hue saturation value ("HSV") of the pixel as discussed above. At 1215 the V value of the pixel can be compared against a threshold value. The threshold value can be any V value that can be used to differentiate between pixels within the background of the image and pixels within the foreground (cell or particle) of the image. For example, a V value of 204 can be used as a threshold value.

At 1220, the processor can label the pixel based on the V value of the pixel. If the pixel is less than the threshold V value, the pixel can be labelled a background pixel. If the pixel is greater than or equal to the threshold V value, the pixel can be labelled a foreground (cell or particle) pixel.

At 1225, the processor can determine whether there are more pixels to process. If all the pixels have been processed and labelled, the method can return to, for example, 1120 of FIG. 11. If more pixels require processing, the processor can select another unprocessed pixel from the image.

Figure 13:
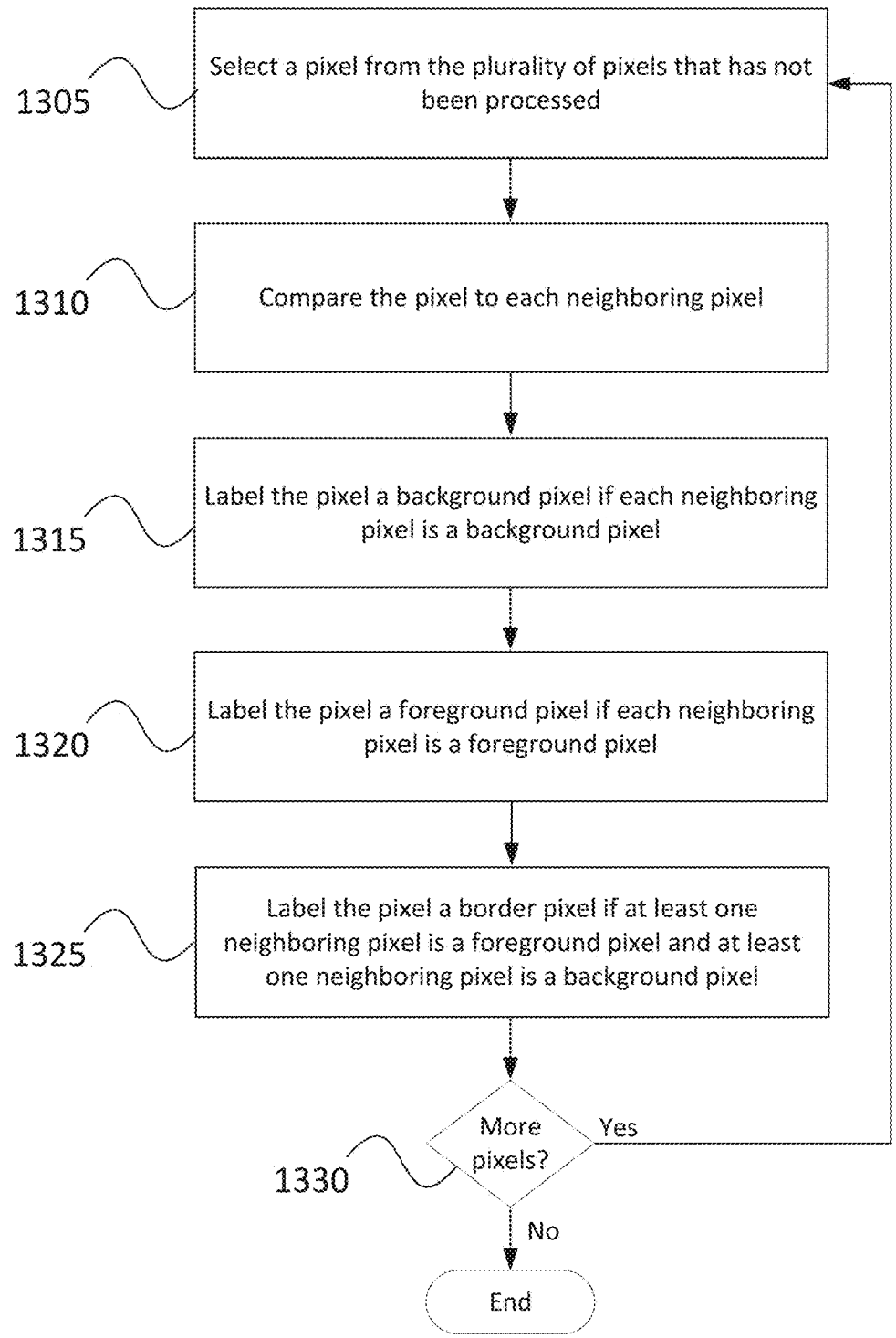
FIG. 13 illustrates yet another flow diagram of a method for performing dynamic focusing according to an embodiment.

FIG. 13 illustrates a flow diagram of a method 1300 containing even more detail for identifying the cell border of the image as discussed above with respect to 1115 of FIG. 11 and the method 1200 of FIG. 12. Method 1300 can be performed by a computer system, for example processing system 140 of FIG. 1 or computing system 1600 of FIG. 16. Method 1300 can be performed after the pixels have been labelled according to the method 1200 of FIG. 12. Each of the pixels of the image can be processed, so at 1305 a pixel that has not been processed by method 1300 can be selected.

At 1310, the selected pixel can be compared to its neighboring pixels. Each pixel has four (4) neighboring pixels (one to the right, one to the left, one above, and one below). At 1315, the pixel can be labelled a background pixel if each of its neighboring pixels is labelled a background pixel. This process can identify stray pixels that were not correctly labelled because of, for example, a pixel that was in the background but above the threshold value.

At 1320, the selected pixel can be labelled a foreground pixel if each of its neighboring pixels is labelled a foreground pixel. This process can also identify stray pixels that were not correctly labelled because, for example, a pixel that was in the foreground was below the threshold value.

At 1325, the selected pixel can be labelled a border pixel if at least one neighboring pixel is a foreground pixel and at least one neighboring pixel is a background pixel. The process can continue until no pixels remain to be processed as determined at 1330.

Figure 14:
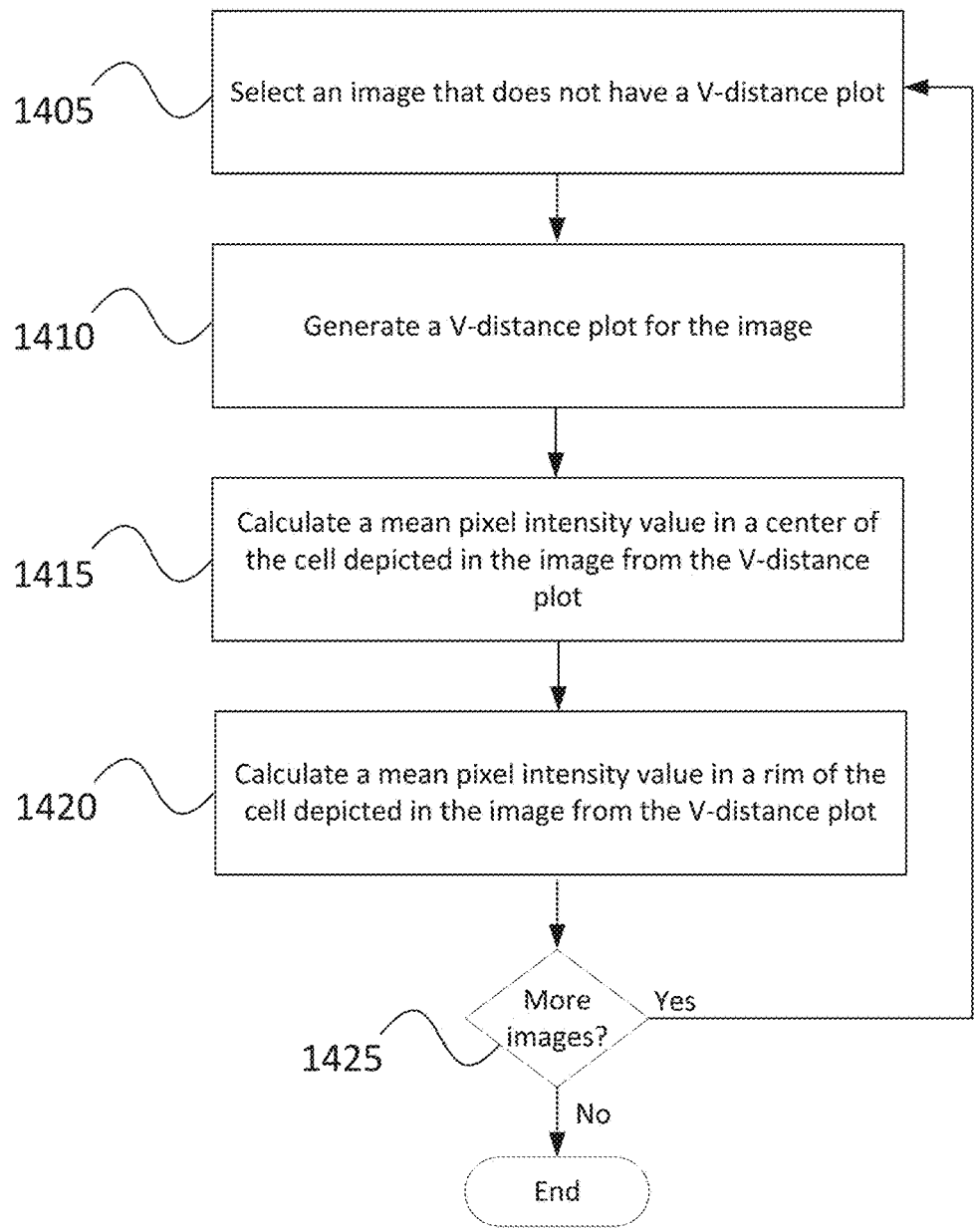
FIG. 14 illustrates still another flow diagram of a method for performing dynamic focusing according to an embodiment.

FIG. 14 illustrates a flow diagram of a method 1400 for performing dynamic focusing. The method 1400 can be performed in conjunction with the method 1100 of FIG. 11. Method 1400 can be performed by a computer system, for example processing system 140 of FIG. 1 or computing system 1600 of FIG. 16. The processing provided in method 1400 can be performed on each image in the plurality of images collected by the image capture device. At 1405, an image that does not have a V-distance plot can be selected.

At 1410, a V-distance plot can be generated for the image as discussed above with respect to FIG. 5. As described above, the V-distance plot can be generated by first identifying the border of the image and calculating the V value for each bin derived from the image as described above with respect to FIG. 4.

At 1415, based on the V-distance plot, the mean pixel intensity value can be calculated for the center of the cell. The center of the cell can be identified using the V-distance plot as described above with respect to FIG. 6 by finding the midpoint between the valley of the V-distance plot and the left edge of the V-distance plot. Once the center portion of the cell is identified by the V-distance plot, the mean pixel intensity value for that portion of the cell can be determined from the V-distance plot by calculating the mean value for all the V values in the portion identified as the center of the cell.

At 1420, based on the V-distance plot, the mean pixel intensity value can be calculated for the rim of the cell. The rim of the cell can be identified using the V-distance plot as described above with respect to FIG. 6 by finding the midpoint between the valley of the V-distance plot and the left edge of the V-distance plot. Once the rim portion of the cell is identified by the V-distance plot, the mean pixel intensity value for that portion of the cell can be determined from the V-distance plot by calculating the mean value for all the V values in the portion identified as the rim of the cell.

At 1425 the processor can determine whether there are additional images to be processed by generating the V-distance plot. The process can continue until all images have been processed.

Figure 15:
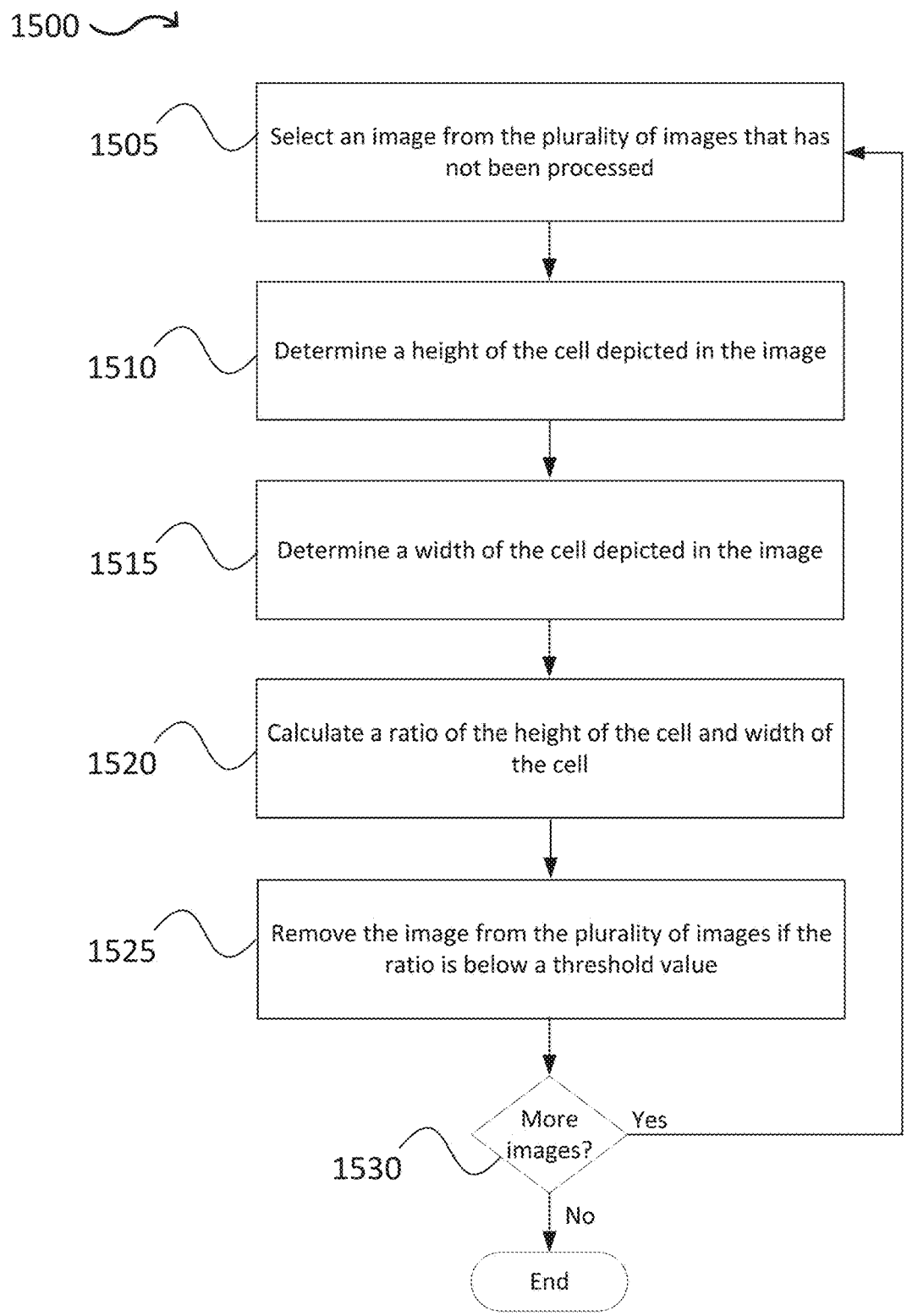
FIG. 15 illustrates yet another flow diagram of a method for performing dynamic focusing according to an embodiment.

FIG. 15 illustrates a flow diagram of a method 1500 for identifying images that are not ideal to be used in the analysis. As described above with respect to FIG. 8, cells that are tilted with respect to the focal plane or that are abnormally shaped are not ideal to use. Method 1500 can be performed by a computer system, for example processing system 140 of FIG. 1 or computing system 1600 of FIG. 16. Method 1500 can be used to identify those images that should not be used. Method 1500 can be used in conjunction with method 1100 of FIG. 11. Each of the images can be processed to determine whether the image should be included in the analyzed images.

At 1505, an image that has not been processed can be selected. At 1510, the image can be analyzed to determine a height of the cell being depicted. The height of the cell can be determined by first identifying the border, as described in detail above with respect to FIG. 4. Once the border has been identified, the longest axis of the cell can be identified. The longest axis can be the height.

At 1515 the width of the cell can be determined. The width of the cell can be the length of the cell perpendicular to the height of the cell. The location of the length of the cell perpendicular to the height of the cell can be at a center point of the height of the cell.

At 1520, a ratio can be calculated between the height and width of the cell. If the ratio of the height and width of the cell is approximately one (1), the cell is substantially circular and therefore likely properly aligned. If the ratio of the height and width of the cell is above or below a threshold value (e.g., less than 0.7 or greater than 1.3) the cell is not substantially round, normally shaped, and/or properly aligned with the focal plane.

If the cell is outside the threshold values, at 1525, the image can be removed from the plurality of images. Once removed from the plurality of images, the image can be not included in the analysis to determine whether the image capture device is properly focused.

The method 1500 can be performed on each image, so the processor can determine whether there are more images to be analyzed and, if not, select another image to process. If all the images have been processed, the method 1500 can terminate.

Figure 16:
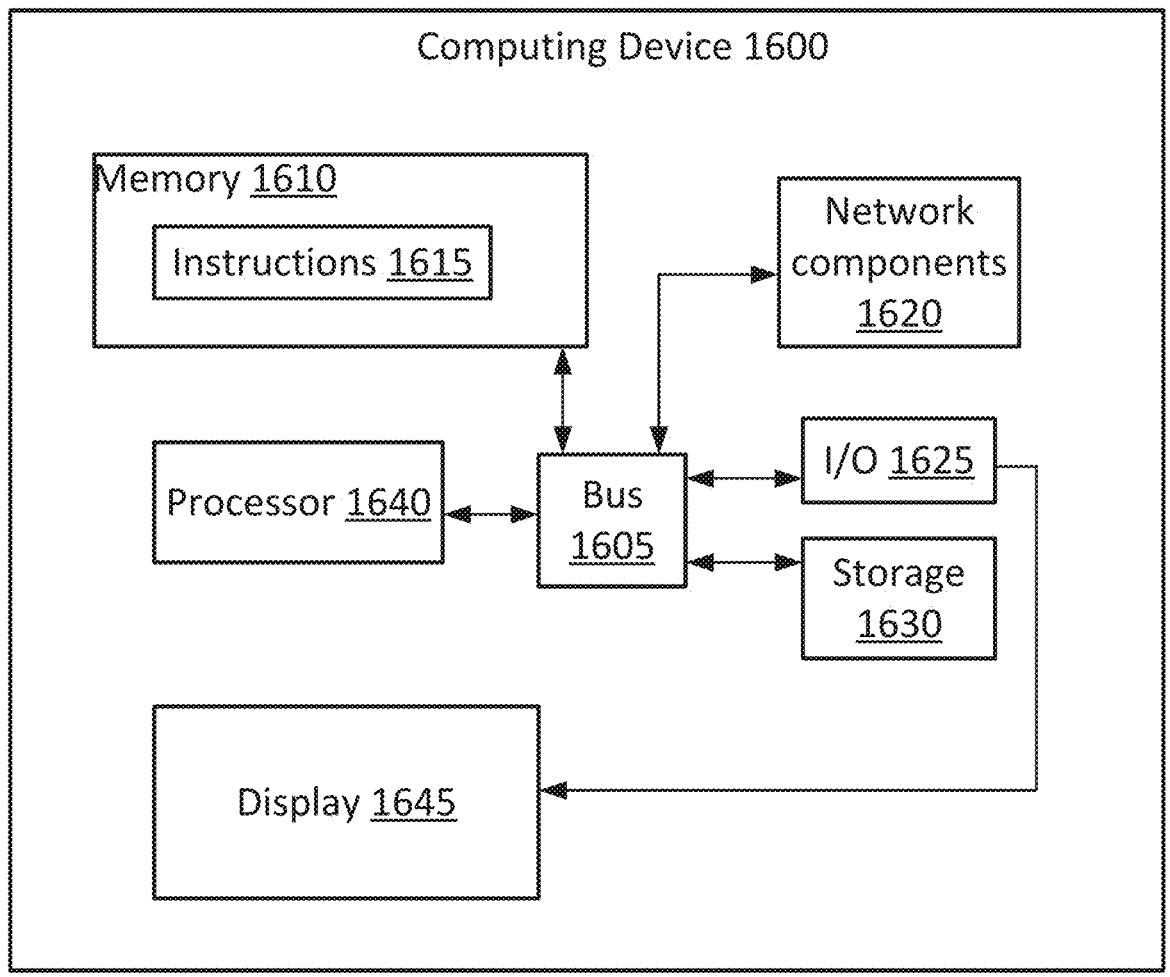
FIG. 16 illustrates a block diagram of an example computer system usable for performing dynamic focusing according to an embodiment.

FIG. 16 illustrates a block diagram of an example computer system 1600 usable for performing image analysis, normalization, and display. The computing device 1600 can be or include, for example, a laptop computer, desktop computer, tablet, e-reader, smart phone or mobile device, smart watch, personal data assistant (PDA), or other electronic device.

The computing device 1600 can include a processor 1640 interfaced with other hardware via a bus 1605. A memory 1610, which can include any suitable tangible (and non-transitory) computer readable medium, such as RAM, ROM, EEPROM, or the like, can embody program components (e.g., instructions 1615) that configure operation of the computing device 1600. In some examples, the computing device 1600 can include input/output ("I/O") interface components 1625 (e.g., for interfacing with a display 1645, keyboard, or mouse) and additional storage 1630.

The computing device 1600 can include network components 1620. Network components 1620 can represent one or more of any components that facilitate a network connection. In some examples, the network components 1620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 1620 can be wired and can include interfaces such as Ethernet, USB, or IEEE 1394.

Although FIG. 16 depicts a single computing device 1600 with a single processor 1640, the system can include any number of computing devices 1600 and any number of processors 1640. For example, multiple computing devices 1600 or multiple processors 1640 can be distributed over a wired or wireless network (e.g., a Wide Area Network, Local Area Network, or the Internet). The multiple computing devices 1600 or multiple processors 1640 can perform any of the steps of the present disclosure individually or in coordination with one another.

Each of the calculations or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

It is to be understood that the figures and descriptions of embodiments of the invention have been simplified to illustrate elements that are relevant for a clear understanding of the invention. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

All patents, patent publications, patent applications, journal articles, books, technical references, and the like discussed in the instant disclosure are incorporated herein by reference in their entirety for all purposes.

The invention claimed is:

1. A system, comprising:
  a flowcell configured to allow fluid samples having a plurality of particles to stream the plurality of particles past an image capture site;
  an image capture device configured to capture an image of each particle in the plurality of particles as it streams through the flowcell past the image capture site;
  a focusing mechanism for moving the image capture device to ensure the images captured by the image capture device of each particle in the plurality of particles are in focus; and
  a dynamic focusing controller, communicatively coupled to the image capture device and the focusing mechanism, the dynamic focusing controller comprising:
    a processor; and
    a memory having stored thereon instructions that, when executed by the processor, cause the processor to:
      receive a plurality of images from the image capture device, each image in the plurality of images comprising a plurality of pixels that provide a visual depiction of a particle from the plurality of particles;
      for each image in the plurality of images:
        determine a border of the particle within the image; and
        calculate a pixel intensity ratio of the image based on the border of the particle within the image;
      calculate a median pixel intensity ratio from the pixel intensity ratios for each image in the plurality of images;
      determine a focal distance direction based on the median pixel intensity ratio;
      calculate a focal distance based on the median pixel intensity ratio when the focal distance direction is positive;
      calculate the focal distance based on a median border width when the focal distance direction is negative; and
      send an instruction to the focusing mechanism to adjust the image capture device by the focal distance in the focal distance direction.

2. The system of claim 1, wherein determining the border of the particle within the image comprises instructions that cause the processor to:
  for each pixel in the plurality of pixels:
    calculate a V value of the pixel;
    compare the V value of the pixel to a threshold value; and
    based on the comparing the V value to the threshold value, label the pixel as a background pixel or a foreground pixel.

3. The system of claim 2, wherein determining the border of the particle within the image further comprises instructions that cause the processor to:
  for each pixel in the plurality of pixels:
    compare the pixel to each neighboring pixel, and:
      if each neighboring pixel is labelled as a background pixel, label the pixel as a background pixel,
      if each neighboring pixel is labelled as a foreground pixel, label the pixel as a foreground pixel, and
      if at least one neighboring pixel is labelled as a background pixel and at least one neighboring pixel is labelled as a foreground pixel label the pixel as a border pixel.

4. The system of claim 1, wherein the instructions further comprise instructions that, when executed by the processor, cause the processor to:
  generate a V-distance plot for each image in the plurality of images based on the border of the particle within the image, and
  wherein calculating the pixel intensity ratio of the image is based on a mean pixel intensity value in a rim of the particle and a mean pixel intensity value in a center of the particle, the mean pixel intensity value in the rim of the particle and the mean pixel intensity value in the center of the particle being determined from the V-distance plot for the image.

5. The system of claim 1, wherein the instructions further comprise instructions that, when executed by the processor, cause the processor to:
  for each image in the plurality of images:
    determine a height of the particle within the image;
    determine a width of the particle within the image;
    calculate a ratio of the height of the particle and the width of the particle;
    determine that the ratio is below a threshold value; and
    remove the image from the plurality of images.

6. The system of claim 1, wherein the instructions further comprise instructions that, when executed by the processor, cause the processor to:
  calculate a border width of each image in the plurality of images; and
  calculate a median border width based on the border width of each image in the plurality of images.

7. The system of claim 2, wherein the pixel is labelled a background pixel if the V value is less than the threshold value and the pixel is labelled a foreground pixel if the V value is greater than or equal to the threshold value.

8. A method, comprising:
  receiving, by a controller, a plurality of images from an image capture device, each image in the plurality of images comprising a plurality of pixels that provide a visual depiction of a particle from a plurality of particles;
  for each image in the plurality of images:
    determining, by the controller, a border of the particle within the image; and
    calculating, by the controller, a pixel intensity ratio of the image based on the border of the particle within the image;
  calculating, by the controller, a median pixel intensity ratio from the pixel intensity ratios for each image in the plurality of images;
  determining, by the controller, a focal distance direction based on the median pixel intensity ratio;
  calculating, by the controller, a focal distance based on the median pixel intensity ratio when the focal distance direction is positive;
  calculating, by the controller, the focal distance based on a median border width of the plurality of images when the focal distance direction is negative; and
  determining, by the controller, that the focal distance exceeds a threshold value.

9. The method of claim 8, wherein determining the border of the particle within the image comprises:

for each pixel in the plurality of pixels:
   calculating a V value of the pixel;
   comparing the V value of the pixel to a threshold value; and
   based on the comparing the V value to the threshold value, labelling the pixel as a background pixel or a foreground pixel.

10. The method of claim 9, wherein determining the border of the particle within the image further comprises:
for each pixel in the plurality of pixels:
   comparing the pixel to each neighboring pixel, and:
      if each neighboring pixel is labelled as a background pixel, labelling the pixel as a background pixel,
      if each neighboring pixel is labelled as a foreground pixel, labelling the pixel as a foreground pixel, and
      if at least one neighboring pixel is labelled as a background pixel and at least one neighboring pixel is labelled as a foreground pixel label the pixel as a border pixel.

11. The method of claim 8, further comprising:
generating, by the controller, a V-distance plot for each image in the plurality of images based on the border of the particle within the image, and
wherein calculating the pixel intensity ratio of the image is based on a mean pixel intensity value in a rim of the particle and a mean pixel intensity value in a center of the particle, the mean pixel intensity value in the rim of the particle and the mean pixel intensity value in the center of the particle being determined from the V-distance plot for the image.

12. The method of claim 8, further comprising:
for each image in the plurality of images:
   determining, by the controller, a height of the particle within the image;
   determining, by the controller, a width of the particle within the image;
   calculating, by the controller, a ratio of the height of the particle and the width of the particle;
   determining, by the controller, that the ratio is below a threshold value; and
   removing, by the controller, the image from the plurality of images.

13. The method of claim 8, further comprising:
calculating, by the controller, a border width of each image in the plurality of images; and
calculating, by the controller, a median border width based on the border width of each image in the plurality of images.

14. The method of claim 8, further comprising:
inhibiting, by the controller, results of the plurality of images if a state of the controller is patient sample; and
failing, by the controller, results of the plurality of images if a state of the controller is control sample.

15. A processor-readable device comprising instructions that, when executed by a processor, cause the processor to:
receive a plurality of images from an image capture device, each image in the plurality of images comprising a plurality of pixels that provide a visual depiction of a particle from a plurality of particles;
for each image in the plurality of images:
   determine a border of the particle within the image; and
   calculate a pixel intensity ratio of the image based on the border of the particle within the image;
calculate a median pixel intensity ratio from the pixel intensity ratios for each image in the plurality of images;
determine a focal distance direction based on the median pixel intensity ratio;
calculate a focal distance based on the median pixel intensity ratio when the focal distance direction is positive;
calculate the focal distance based on a median border width when the focal distance direction is negative; and
send an instruction to a focusing mechanism to adjust the image capture device by the focal distance in the focal distance direction.

16. The processor-readable device of claim 15, wherein determining the border of the particle within the image comprises instructions that cause the processor to:
for each pixel in the plurality of pixels:
   calculate a V value of the pixel;
   label the pixel a background pixel if the V value is less than a threshold value; and
   label the pixel a foreground pixel if the V value is greater than or equal to the threshold value.

17. The processor-readable device of claim 16, wherein determining the border of the particle within the image further comprises instructions that cause the processor to:
for each pixel in the plurality of pixels:
   compare the pixel to each neighboring pixel, and:
      if each neighboring pixel is labelled as a background pixel, label the pixel as a background pixel,
      if each neighboring pixel is labelled as a foreground pixel, label the pixel as a foreground pixel, and
      if at least one neighboring pixel is labelled as a background pixel and at least one neighboring pixel is labelled as a foreground pixel label the pixel as a border pixel.

18. The processor-readable device of claim 15, further comprising instructions that, when executed by the processor, cause the processor to:
generate a V-distance plot for each image in the plurality of images based on the border of the particle within the image, and
wherein calculating the pixel intensity ratio of the image is based on a mean pixel intensity value in a rim of the particle and a mean pixel intensity value in a center of the particle, the mean pixel intensity value in the rim of the particle and the mean pixel intensity value in the center of the particle being determined from the V-distance plot for the image.

19. The processor-readable device of claim 15, further comprising instructions that, when executed by the processor, cause the processor to:
for each image in the plurality of images:
   determine a height of the particle within the image;
   determine a width of the particle within the image;
   calculate a ratio of the height of the particle and the width of the particle;
   determine that the ratio is below a threshold value; and
   remove the image from the plurality of images.

20. The processor-readable device of claim 15, further comprising instructions that, when executed by the processor, cause the processor to:
calculate a border width of each image in the plurality of images; and
calculate a median border width based on the border width of each image in the plurality of images.

* * * * *